Sept. 20, 1971   W. H. HAGGERTY   3,606,570

ROTOR ASSEMBLY FOR ROTARY WING AIRCRAFT

Filed Aug. 11, 1969   3 Sheets-Sheet 1

*INVENTOR*
WILLETT H. HAGGERTY

*ATTORNEY*

INVENTOR
WILLETT H. HAGGERTY

ATTORNEY

INVENTOR
WILLETT H. HAGGERTY

ATTORNEY

United States Patent Office 3,606,570
Patented Sept. 20, 1971

3,606,570
ROTOR ASSEMBLY FOR ROTARY
WING AIRCRAFT
Willett H. Haggerty, Corpus Christi, Tex., assignor to
The VLM Corporation, Fort Worth, Tex.
Filed Aug. 11, 1969, Ser. No. 848,990
Int. Cl. B64c 27/20
U.S. Cl. 416—2
11 Claims

ABSTRACT OF THE DISCLOSURE

A rotary wing, vertical lift aircraft includes a central fuselage and a rotor consisting of an inner annular hub rotatably supported on and encircling the fuselage, radially extending rotor blades, and an outer supporting ring. The rotor is adapted to be driven by a turbine device associated with the rotor outer ring and an outer track nonrotatably attached to the fuselage. Each rotor blade is attached to a support member in the hub structure, and the support members are interconnected by tension members designed to separate from the support members under predetermined load whereby the rotor structure will separate fom the body in the event that one rotor blade is lost creating an unbalance in the rotor.

BACKGROUND OF THE INVENTION

In rotary wing, vertical lift aircraft which are powered by rotors having a plurality of airfoil members attached to and extending radially from a hub member, a severe unbalance occurs if one airfoil member or blade is either fully or partially lost, resulting in severe vibration of the aircraft. To prevent complete loss of the aircraft it is desirable to release the entire rotor structure from the fuselage, provided that means such as a parachute is provided to effect safe descent of the aircraft.

An additional safety hazard is presented when the aircraft is designed such that the rotor is an annular structure encircling the fuselage and passenger cabin. With this structure, the loss of a rotor airfoil member would be particularly dangerous to occupants of aircraft, since the unbalance creates force tending to move the entire rotor structure horizontally whereby the annular hub would tend to penetrate the fuselage and very possibly injure occupants of the aircraft or damage the controls before emergency maneuvers could be taken.

It is very desirable, therefore, for an aircraft of this design, to provide an inner ring or hub structure which will quickly release the remaining airfoil members in the event of loss of one such member, before the rotor structure can penetrate the fuselage to injure passengers or further damage the structure and equipment of the aircraft.

An object of this invention, therefore, is to provide a rotor structure including an annular hub member and radial airfoil members wherein the inner ends of the airfoil members are connected by tension members designed to release under predetermined load.

Another object of this invention is to provide a rotor structure comprising an annular hub structure including individual airfoil support members for each airfoil member, and the individual support members designed to separate from the hub structure under predetermined load.

These objects are attained in a rotor comprising an annular hub structure including a plurality of spaced airfoil support members and a radially extending airfoil member connected to each support member. The hub annular structure further includes a plurality of tension members which are connected between the adjacent airfoil support members, the tension members being connected to the support members by means designed to release under predetermined load.

When the tension members release from the airfoil support members, the airfoil support members and the associated airfoil members release from the annular hub structure and fall away from the aircraft.

DRAWINGS

Other objects and advantages of the invention will become apparent from a reading of the following description, in connection with the attached drawing in which.

DESCRIPTION OF THE PREFERRED EMBODIMENT

Figure 1:
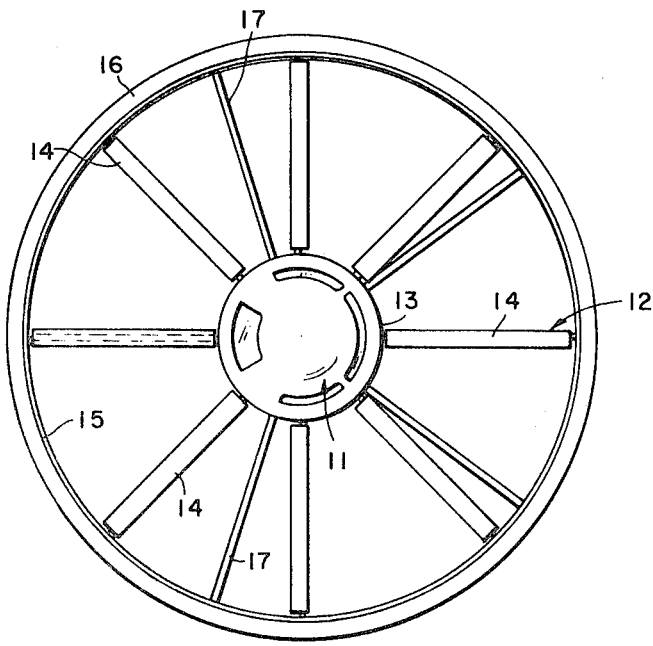
FIG. 1 is a plan view of a form of rotary wing aircraft to which the present invention is adapted.
Figure 2:
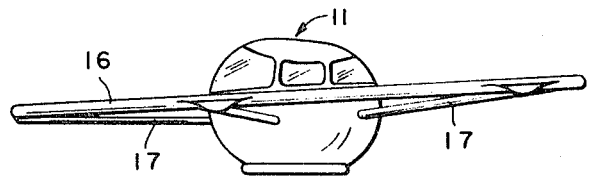
FIG. 2 is a side elevation view of the aircraft of FIG. 1.

FIGS. 1 and 2 of the drawing are general views of a rotary wing aircraft of a type to which the rotor structure according to the present invention is particularly adapted. The aircraft includes a fuselage or body 11, which is generally spherical in shape, and a rotor assembly 12 which is rotatably mounted directly on the fuselage 11. The rotor assembly includes an inner annular ring or hub 13, eight radially extending and equally spaced rotor blades 14 which define airfoils in the manner of a helicopter, and an outer support ring 15 to which the outer ends of the rotor blades are attached. The annular hub 13 is supported and confined within a guiding channel track disposed in a generally horizontal plane about the outer periphery of the fuselage 11; and suitable bearing means are provided between the fuselage guide track and the rotor hub.

The rotor outer ring 15 is guided in a track defined by a nonrotatable outer ring 16 supported relative to the body 11 by five radial struts 17. The aircraft may be powered by a turbine system, not shown, consisting of turbine blades provided in the outer rotor ring 15 and turbine nozzles provided in the track ring 16. A source of compressed gas for the turbine may be provided in the fuselage 11, with the compressed gas being supplied to the turbine nozzles through conduits defined by the struts 17. One embodiment of an aircraft employing the outer ring structure is disclosed in U.S. Pat. No. 3,507,461.

As suggested by the fuselage windows shown in FIG. 1, the upper portion of the spherical fuselage may enclose the cabin for the passengers and crew, while the lower portion may enclose compartments for the power and other equipment of the aircraft and for storage.

Figure 3:
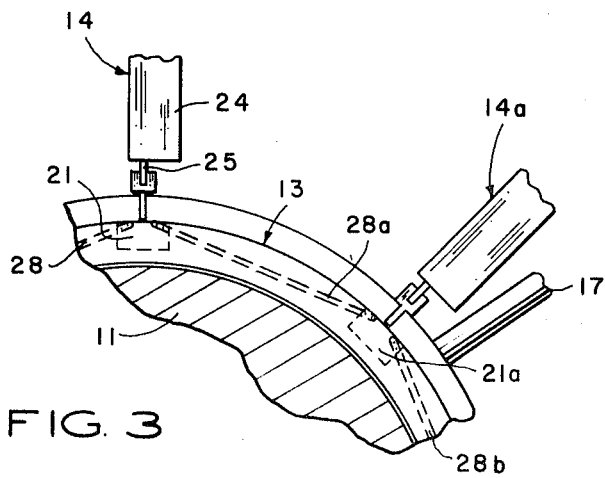
FIG. 3 is a fragmentary view of a portion of the rotor structure including the annular hub structure and rotor blades, as viewed in the plane of the upper surface of the rotor hub.
Figure 4:
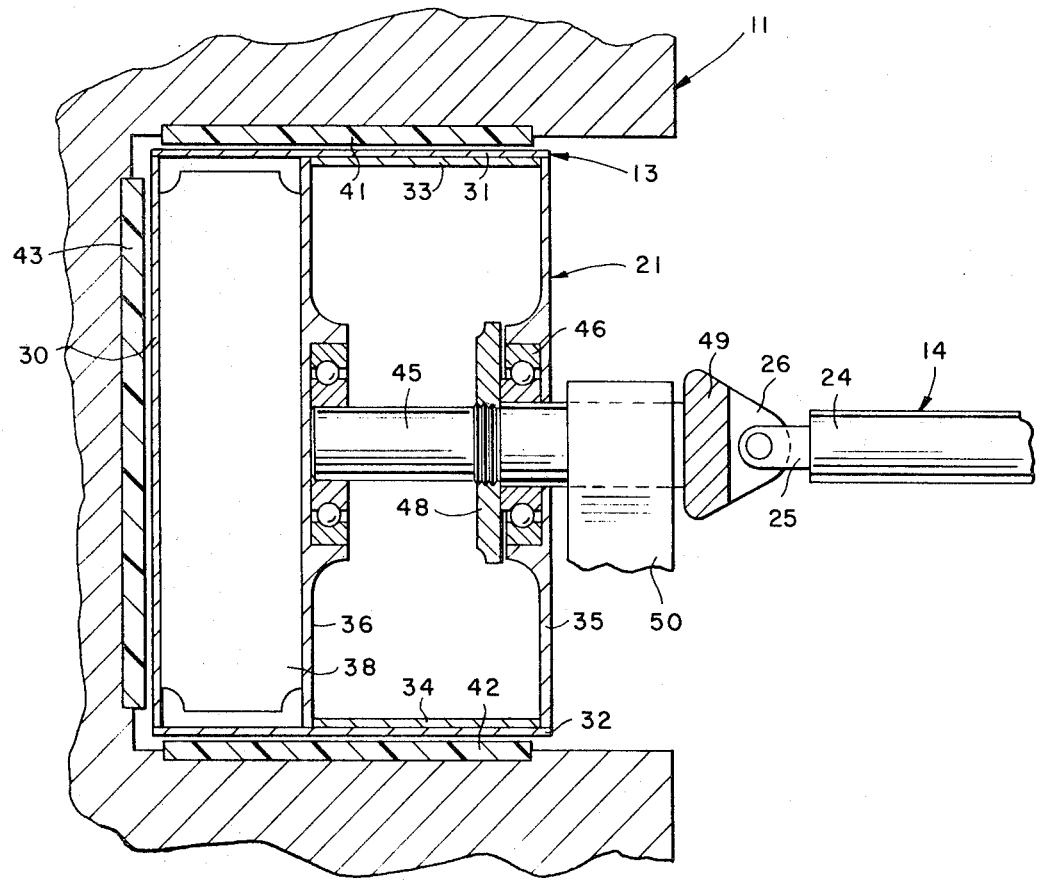
FIG. 4 is a fragmentary sectional view of the rotor blade mounting arrangement taken in a radial plane.

FIG. 3 is a plan view of a portion of the rotor assembly illustrating the several components thereof. The rotor hub 13 is a unitary structure defining an annulus that is generally rectangular in cross-section as best seen in FIG. 4. Incorporated as parts of this unitary structure are eight rotor blade mounting members or assemblies 21 illustrated in detail in FIG. 4, and which are shown in dotted line outline in FIG. 3. While these assemblies are a part of the unitary structure of the hub ring, they are designed, as will be described, to separate from the ring under certain conditions.

As indicated in the drawing, a rotor blade 14 includes an airfoil structure 24 nonrotatably fixed to a longitudinally extending spar 25. At the inner end of the blade, the spar is hingedly connected to the blade support member 21 by means of a clevis-type hinge 26 permitting the blade to swing in a generally vertical plane relative to the hub 13. The outer end of the rotor blade is engaged with the outer rotor ring 15 by means (not shown) which permits rotation of the blade for pitch control and pivotal movement to permit coning of the rotor assembly. As part of the inner ring structure, to counteract the centrifugal force of the rotor blades, the blade support members 21 are interconnected to each other by tension rods 28. These tension rods 28, along with the support members 21, define a polygonal (in this case octagonal) structure which assists in preventing distortion of the unitary inner ring structure.

Figure 5:
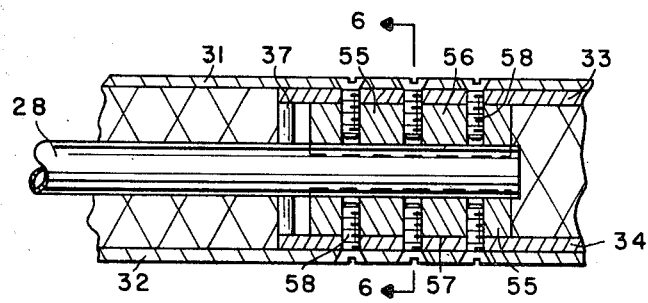
FIG. 5 is a fragmentary sectional view illustrating the tension member mounting taken in a vertical longitudinal plane through the tension member.
Figure 6:
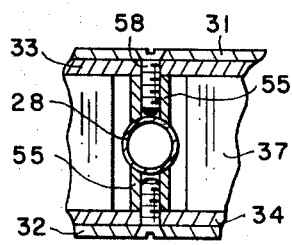
FIG. 6 is a transverse section view taken along the line 6—6 of FIG. 5.

As best seen in FIGS. 4 and 5, the unitary structure of the hub 13 includes upper and lower flat annular rings or plates 31 and 32 respectively, which define upper and lower walls of the hub assembly and an inner cylindrical wall 30. The rotor blade support members 21 consist of fabricated box structures which include upper and lower walls, 33 and 34 respectively, and outer and inner walls 35 and 36 respectively. These members may also include partial end walls or ribs 37 for structural rigidity. The upper and lower support member walls 33 and 34 are secured to the upper and lower ring walls 31 and 32; and the intervening spaces between the support members 21 may be occupied by laminated honeycomb elements of fiber glass or aluminum, for example, to provide strength and rigidity to the hub assembly 13. The inner support member walls are radially spaced from the ring wall 30 by collapsible supporting ribs 38 for example.

As best seen in FIG. 4, the channel or track of the fuselage 11 is a generally rectangular annular groove or recess which is an integral part of the fuselage structure and serves primarily as a rigid channel to house the inner rotor ring 13 and allow it to rotate freely while still maintaining a true running path. FIG. 4 illustrates air bearings for supporting the inner ring consisting of upper and lower bearing pads 41 and 42 and inner bearing pad 43. These structures are designed to provide a close clearance between the upper bearing pad 41 and upper plate 31, between the lower bearing pad 42 and lower plate 32, and between the inner wall 30 and bearing pad 43; and means would be provided to maintain suitable air pressure between these air bearing surfaces.

Referring further to the rotor blade mounting assembly 21, the rotor blade spar 25 is secured to a spindle 45 which extends radially through an aperture in the outer wall 35 of the support assembly and is rotatably supported by means of a thrust bearing 46 mounted on the outer wall 35 and a rotary bearing 47 mounted in the inner wall 36. A thrust plate 48, threaded on the spindle 45, bears against the thrust bearing 46 to absorb the centrifugal force of the rotor blade. The spindle 45 terminates at its outer end in a forked bracket 49 defining the clevis-type hinge 26 by means of which the blade spar 25 is connected to the spindle 45. This structure, it will be seen, permits rotation of the rotor blade 14 about its axis to provide for blade pitch control; and this control may be provided through an arm 50 which is nonrotatably fixed to the spindle 45 at the exterior of the blade support 21.

Referring particularly to FIGS. 4 and 5, the tension rods 28 consists of single hollow tubular members extending between each adjacent pair of blade support members 21. The ends of the rod are provided with upper and lower ribs 55, suitably formed or secured to the rod 28, and which define upper and lower surfaces 56 and 57 dimensioned to lie contiguous to the confronting surfaces of the upper and lower walls 33 and 34 of the support member box structure. As seen in FIG. 5, the ribs 55 are each provided with three longitudinal spaced threaded bores to receive flat head screws 58; and the upper and lower walls 33 and 34 of the support member 21 and the upper and lower plates 31 and 32 of the hub assembly 13 are provided with aligned bores so that, in assembly, the screws 58 pass through these bores and are threaded into the ribs 55 to secure the tension rods to the support structures 21 and additionally secure the blade support structures 21 to the plates 31 and 32. The longitudinally spaced screws define a rigid angular relationship between the tension members and respective blade support members. This fabricated assembly is designed so that the screws 58 will shear under predetermined conditions.

In the illustrated and described embodiment, the six screws 58 connecting each tension member to a support member together would provide the required shear strength to withstand the normal tensile load applied to the octagon structure by the rotor blades, along with the desired safety factor. During normal operation, these connecting joints are loaded only in tension.

Considering the rotor assembly as illustrated in FIG. 3, should all or a portion of the rotor blade 14a be lost for any reason, the centrifugal force acting on the associated support member 21a will be significantly reduced. The entire rotor assembly is then unbalanced and will tend to move away from the lost blade into the fuselage. Centrifugal forces applied by the rotor blades adjacent to the rotor blade 14a will tend to distort the octagon structure; and this distortion will be permitted and encouraged by movement of the support member 21a radially inward within the hub structure toward the inner wall 30, this movement being permitted by collapse of the support ribs 38. With this distortion, the angle between the two tension rods 28a and 28b connected to the support member 21a will tend to increase; and the resulting change in the angular relationship between the tension rods and the support member will effect a shearing of at least four of the six screws 58 in the planes between the ribs 55 and the confronting surfaces of the walls 33 and 34. Should one or two of the screws 58 not shear under the applied bending moment, they will shear under the applied tensile load so that the tension rod 28a and 28b separate from the support member 21a.

When this separation has occurred at the position of the lost blade 14a, the centrifugal forces applied by the remaining blades, accompanied by further angular distortion of the octagon structure, will effect progressive radial withdrawal of the blades and support members 21 from the hub assembly. These portions of the rotor assembly will then fall away from the fuselage. Because of the forces involved, the above described action and reaction will occur very rapidly so that all of the exterior rotor assembly may fall away without penetrating the fuselage to cause injury to the passengers.

What has been described is a novel rotor assembly which is particularly adapted for use with an aircraft having a central fuselage and a rotor assembly which surround the fuselage; this rotor assembly being designed to break away from the fuselage in the event of a substantial unbalance to prevent penetration of the fuselage by the rotor assembly.

What is claimed is:
1. A rotor for a rotary wing aircraft comprising:
   an annular hub structure including a plurality of peripherally spaced blade support members; a radially extending rotor blade member mounted on each support member;
   a plurality of tension members connecting said support members, at least one tension member being connected between each pair of peripherally adjacent support members;
   and means, separable in response to a predetermined load, connecting said tension members to the respective support members.

2. A rotor as set forth in claim 1 wherein said tension members are connected to said support members in a manner to define a rigid angular relation therebetween.

3. A rotor as set forth in claim 1:
including means separable under predetermined load, connecting said blade support members in said annular structure.

4. A rotor as set forth in claim 1:
including an outer annular member, concentric with said hub structure, connecting the outer ends of said rotor blades 5. A rotor as set forth in claim 1:
wherein said blade support members and said tension members define a polygonal structure within said annular hub structure.

6. A rotor as set forth in claim 1:
wherein said annular structure comprises a pair of annular ring members defining the upper and lower walls thereof;
each of said support members comprising a structure including upper, lower and interconnecting walls; said upper and lower support member walls lying contiguous to said upper and lower annular ring members respectively;
and said means connecting said support members in said structure comprising shear pin means extending through aligned holes in said hub annular ring members and said support member walls.

7. A rotor as set forth in claim 6:
wherein said support member includes a spindle extending through an opening in the interconnecting wall thereof; thrust bearing means for rotationally supporting said spindle relative to said interconnecting wall; and means at the outer end of said spindle providing a non-rotatable hinge connection for a rotor blade.

8. A rotor as set forth in claim 7:
including means nonrotatably connected to said spindle for controlling rotation thereof.

9. A rotor as set forth in claim 6:
wherein each of said tension members includes means at the ends thereof defining opposite faces diposed to lie contiguous to the upper and lower walls of said support member structure;
and said means connecting said tension members to said support members comprising shear pin means extending through aligned holes in said tension members and said upper and lower walls.

10. A rotor as set forth in claim 9:
wherein each of said tension members includes elongated, longitudinal ribs at the ends thereof defining said opposite faces;
said ribs having longitudinally spaced bores therein extending inwardly from said opposite faces for receiving said shear pin means passing through aligned holes in said support member walls; and said longitudinally spaced shear pin means defining a rigid angular relation between the tension members and respective support members.

11. A rotor as set forth in claim 7:
including common shear pin means extending through aligned holes in said upper annular ring, said upper support member wall and said tension member;
and common shear pin means extending through aligned holes in said lower annular ring, said lower support member wall and said tension member.

References Cited

UNITED STATES PATENTS

| | | | |
|---|---|---|---|
| 1,868,392 | 7/1932 | Leffert | 416—171X |
| 2,521,684 | 9/1950 | Bates | 416—167X |
| 2,701,021 | 2/1955 | Sargent | 416—2 |
| 2,740,595 | 4/1956 | Bakewell | 416—140X |
| 2,835,332 | 5/1958 | Fry | 416—171X |
| 3,352,513 | 11/1967 | Baker et al. | 416—2X |
| 3,437,290 | 4/1969 | Norman | 244—23C |
| 3,507,461 | 4/1970 | Rosta | 244—23CX |

EVERETTE A. POWELL, Jr., Primary Examiner

U.S. Cl. X.R.

416—189; 244—23